(12) United States Patent
Douglas et al.

(10) Patent No.: US 6,338,511 B1
(45) Date of Patent: Jan. 15, 2002

(54) ROOT CUTTING SHOVEL

(76) Inventors: Ormond S. Douglas, Rte. 1, Box 488, Livingston, TX (US) 77351; William P. Killen, 46 Merriel, Dayton, TX (US) 77535

( * ) Notice: Subject to any disclaimer, the term of this patent is extended or adjusted under 35 U.S.C. 154(b) by 0 days.

(21) Appl. No.: 09/482,420

(22) Filed: Jan. 13, 2000

Related U.S. Application Data
(60) Provisional application No. 60/116,289, filed on Jan. 19, 1999.

(51) Int. Cl.$^7$ ................................................ A01B 1/02
(52) U.S. Cl. ............................................ 294/49; 294/51
(58) Field of Search ........................ 294/49, 51, 54.5, 294/55, 60; 7/116; 30/308.1, 315; 172/13, 19, 371, 375, 377, 378, 380, 381; D8/10, 11

(56) References Cited

U.S. PATENT DOCUMENTS

| | | | |
|---|---|---|---|
| 285,693 A | * 9/1883 | Shinabery et al. | ............ 294/49 |
| 324,336 A | 8/1885 | Nye | |
| 502,720 A | 8/1893 | Hazel | |
| 856,575 A | * 6/1907 | Elliott | ........................ 294/49 |
| 902,983 A | * 11/1908 | Manahan | .................... 294/49 |
| 960,247 A | 6/1910 | Ball | |
| 1,305,079 A | * 5/1919 | Eaton et al. | .................. 294/49 |
| 1,888,170 A | * 11/1932 | Hornbaker | ................... 294/49 |
| 2,192,827 A | * 3/1940 | Dahl | ........................ 294/55 X |
| 2,247,958 A | 7/1941 | Maxcy | |
| 2,852,996 A | 9/1958 | Meyer | |
| 2,909,385 A | 10/1959 | Meredich | |
| 3,782,770 A | * 1/1974 | Lee | .............................. 294/49 |

FOREIGN PATENT DOCUMENTS

| | | | | |
|---|---|---|---|---|
| FI | 27131 | * | 1/1955 | .................. 294/49 |
| JP | 274970 | * | 11/1989 | .................. 294/49 |
| NL | 8502706 | * | 5/1987 | .................. 294/49 |

* cited by examiner

Primary Examiner—Johnny D. Cherry
(74) Attorney, Agent, or Firm—James L. Jackson; Andrews & Kurth (57) ABSTRACT

A shovel for manual use, comprising a shovel blade having concave and convex faces and defining a longitudinal center-line and having side edges, an upper edge and a forward cutting edge. The shovel blade defines a handle connector receptable having a shovel handle fixed therein. A root cutting blade is fixed to the shovel blade substantially along the longitudinal center-line and projects from the concave face of the shovel blade. A sharpened root cutting edge is defined on the root cutting blade and is oriented toward the forward cutting edge of the shovel blade. The root cutting edge of the central blade preferably defines an intermediate edge recess and forms a slightly inclined sharp edge section for enhancing root cutting action. A pair of side blades are fixed to side edge portions of the shovel blade and are oriented in diverging relation projecting from the convex face of the shovel blade. The side blades also preferably define forwardly inclined sharpened cutting edges and are located for cutting surface roots at respective sides of the shovel blade to facilitate efficient fracturing of the soil when the shovel blade has penetrated into the soil and is pivoted to pry a soil load loose from the surrounding soil.

18 Claims, 3 Drawing Sheets

ROOT CUTTING SHOVEL

Applicants hereby claim the benefit of U.S. Provisional Application Ser. No. 60/116,289, filed on Jan. 19, 1999 by Ormond S. Douglas and William P. Killen and entitled "Root Cutting Shovel", for all purposes.

BACKGROUND OF THE INVENTION

1. Field of the Invention

The present invention relates generally to manually used shovels, such as are typically utilized for cutting through soil, grass roots and small tree roots as the user digs into soil. More particularly, the present invention concerns a root cutting shovel having the capability for cutting through tree roots that cannot ordinarily be cut by conventional shovels and cutting through surface oriented grass and weed roots to enable efficient handling of the soil, including consolidated soil or loose soil, being shoveled. Even more particularly, the present invention concerns a shovel geometry that enables the soil load being cut away and removed by the shovel to remain on the blade of the shovel as the soil is cut and lifted, thus minimizing the labor that is ordinarily needed for general shoveling activities.

2. Description of the Prior Art

Though a wide variety of shovels have been developed for a wide variety of specific shoveling needs, the present invention is directed generally to round point shovels having a long straight handle or a D-handle. Round point shovels typically have a curved shovel blade with a concave blade face directed in a forward direction, away from the user and a convex blade face directed rearwadly or toward the user. At its rear end the shovel blade typically define a tubular handle connector that is typically of curved configuration and which receives a shovel handle of the long straight type or of the D-handle type. The tubular handle typically extends from the central region of the shovel blade, being forged or otherwise formed by the blade structure and extends upwardly well beyond the upper edge of the shovel blade where it forms a receptacle to receive the shovel handle. The tubular handle connector or receptacle is typically of tapered internal configuration and the lower end of the handle is likewise tapered to establish a good surface-to-surface fit between the handle connector and handle.

The handle connector is typically oriented with respect to the shovel blade to provide for angulation or inclination of the longitudinal center-line of the shovel blade relative to the shovel handle. This angulation or inclination of the shovel blade relative to the shovel handle permits the shovel blade to be oriented at a slightly inclined relation with the horizontal, with the shovel blade at ground level, while the handle of the shovel is positioned with its upper end at substantially waist or hip level of a user. In this shovel position the blade of the shovel can be used efficiently to skim or skin a substantially flat section of soil or remove grass and weeds from the surface of the soil without deeply disturbing the soil. This feature permits a round point shovel to be efficiently utilized for contouring or controlling the configuration of the surface of the soil. A D-handle for a round point shovel is typically short and the D-handle fitting at the upper end of the handle defines upwardly diverging handle elements which support a transversely oriented griping element of a size for efficient gripping by the gloved or non-gloved hand of a user. A straight shovel handle is typically significantly longer as compared to a D-handle and thus provides significantly greater leverage for efficient shovel use when the soil being cut is of fairly consolidated nature. A user will typically select between a straight handled shovel or a D-handled shovel to suit the shoveling job that is intended.

On each side of the tubular handle connector, the upper portion of the shovel blade defines foot engaging flanges or is provided with a foot engaging element or fitment having a flat surface that is engaged by the right or left foot of the user, as the case may be, thus enabling the user to apply manual force to the shovel blade with the user's foot to drive the shapened forward end of the shovel blade into the soil being cut. On each side of the curved shovel blade side edges are defined which are typically disposed in substantially parallel relation and extend from the rear end portion of the blade. Typically, these side edges are oriented at angles of about 90° with respect to the rear flanged end of the shovel blade and extend downward toward the point of the blade. Typically, the substantially parallel related side edges extend along about the upper third or half of the shovel blade. From this region of a round point shovel blade, the side edges are gradually curved and disposed in converging relation so that they meet at a central point at the lower end of the shovel blade, essentially at the longitudinal center-line of the blade. In some cases, the side edges of the shovel blade are oriented in slightly downwardly converging relation from the upper flanged foot engaging edges of the blade and become more and more curved as the side edges approach the lower pointed end of the blade.

From approximately the lower third of the shovel blade to the centrally located point, the concave portions of the side edges are beveled to define a sharp cutting edge at the interstion of the beveled surface with the convex rear face of the shovel blade. Typically a user of a shovel of this type will frequently file or hone the cutting edge of the blade because, during use, the abrasive characteristics of typical soil will wear away and dull the cutting edge. For this reason, quality shovels have hardened blades to minimize wear and dulling of the cutting edge during normal use.

One of the disadvantages of round point shovels is their inability to cut through tree roots of significant dimension. Though efficient for cutting through grass and weed roots, except at the side of the shovel blade, and for cutting through the small feeder roots of trees, i.e., those roots having a diameter of from ¼" to ½", a round point shovel will function quite efficiently. These shovels, unless extremely sharp, will seldom cut through tree roots exceeding ½" in diameter. Also, when round point shovels come into contact with a tree root they tend to rotate or slide laterally rather than cut through the root because the curved end of the shovel blade, on either side of the sharp point, is typically forced to move laterally by the root, rather than cutting through the root. When a tree root in encountered, for the most part, it is necessary to utilize another implement, such as an axe, to cut through the tree root at each side of the hole being dug, so that the offending section of the root can be removed from the shoveling area.

Another problem with round point shovels is the loss of shovel load when small roots such as the surface roots of grass and small feeder roots of trees remain in the soil at the edges of the shovel. Typically when cutting through soil with a round point shovel, the blade of the shovel will cut into the soil, but the soil at the side edges of the shovel blade will typically contain surface roots which are not cut by the shovel. When the shovel handle is manipulated pivotally about the blade to loosen a section of soil that has been cut, the remaining surface roots at the side edges of the shovel blade will provide resistance to movement of the edges of the soil load of the shovel blade. More often than not, the resistance of the surface roots at the side edges of the shovel blade will be uneven, so that the blade tends to be ted by greater soil and root resistance at one of the side edges as compared with the other. When this occurs, the shovel blade will rotate as soil loosening force is applied and much if not all of the soil load of the shovel will be lost. The user will then be required to use the shovel in a chopping action to cut the lateral surface roots before the intended soil section can be efficiently removed. This, of course, significantly increases the manual labor that is required for soil cutting and removal. It is desirable therefore to provide a round point type shovel which accomplishes lateral surface root cutting as well as conventional blade cutting during use and which therefore does not tend to be rotated by lateral surface root resistance as sections of soil are cut, loosened and removed.

Another problem typically occurs when round point shovels are utilized and tree roots are encountered. A user, typically an inexperienced user, will force the point of the shovel beneath the root and then apply a prying action in an attempt to cause the shovel blade to break through a root. When this is done, the force applied will often break a wooden shovel handle, thus requiring that the shovel be rehandled at significant labor and expense or discarded and replaced. It is thus desirable to provide a round point type shovel having a geometry or configuration that minimizes the occurrence of broken shovel handles even when the shovel is being utilized by a novice. It is also desirable to provide a round point type shovel having the capability for efficiently cutting trough tree roots, including surface feeder roots without necessitating the use of a chopping action when these are encountered during shoveling activities.

SUMMARY OF THE INVENTION

It is a principal feature of the present invention to provide a novel shovel having a round point type shovel blade which is efficient for cutting through tree roots up to two inches or more in diameter when such roots are encountered during shoveling activities;

It is another feature of the present invention to provide a novel shovel having a round point type shovel blade which defines a flattened lower cutting edge section to minimize lateral camming activity as roots are encountered and to make root cutting more effective with the lower cutting edge of the shovel blade;

It is an even further feature of the present invention to provide a novel shovel having a round point type shovel blade which incorporates a central root cutting blade having a forwardly oriented straight, convex or concave cutting edge which permits efficient cutting of tree roots by employing a prying action of the shovel handle;

It is also a feature of the present invention to provide a novel shovel having a round point type shovel blade which has a centrally located root cutting blade projecting in substantially normal relation from the central concave surface of the shovel blade and which defines a shapened lower edge which efficiently contacts and cuts through tree roots as the shovel blade is forced through root containing soil;

It is another feature of the present invention to provide a novel shovel having a round point type shovel blade which is provided, and with side blades being provided at each of the side edges of the shovel blade and which are oriented for cutting through surface roots and thus minimize the potential for shovel blade rotation by uneven blade edge forces; and It is an even further feature of the present invention to provide a novel shovel having a round point type shovel blade having side edge blades each having a sharpened forwardly directed cutting edge for efficient cutting through surface roots of the soil as the shovel blade is forced trough the soil by foot applied manual force.

Briefly, the various objects and features of the present invention are realized through the provision of a manually used shovel having a blade from which extends a handle connector having a suitable handle connected therein. The handle may be of the straight type or of the D-handle type and may be composed of wood, fiberglass, metal or any suitable plastics material or plastics composite. The shovel blade is preferably composed of metal, such as hardened steel, or it may be composed of any other material or combinations of materials that is suitable for the purpose intended.

From the concave front face of the shovel blade a root cutting blade is fixed along the longitudinal center-line of the shovel blade and projects in substantially normal relation with the concave face. Preferably, the central root cutting blade extends from the upper edge of the shovel blade to a location approximately one or two inches from the forward end of the shovel blade, though, if desired, the central root cutting blade may extend completely from the rear end to the sharpened forward end of the shovel blade. Alternatively, the root cutting blade may be fixed to the shovel blade along the longitudinal center-line, with the forward and rearward ends thereof being located short of the forward and rear ends of the shovel blade. The central root cutting blade is preferably configured at its lower end to define a sharpened root cutting edge having a smoothly curved intermediate recess and defining a sharp edged section thereof of slightly inclined relation with the longitudinal center-line, for development of significant cutting force application against tree roots when the shovel blade is pivoted by forcible pivotal movement of the shovel handle. If desired, the sharpened root cutting edge of the centrally located root cutting blade may be of substantially straight, concavely curved or convexly curved configuration and located in inclined relation with respect to the center-line of the shovel blade. If desired, the sharpened root cutting edge of the central root cutting blade may be oriented in substantially normal relation with the longitudinal center-line of the shovel blade. The upper edge of the central root cutting blade is preferably not sharpened, but it may define a sharp cutting edge if desired. The rear or trailing end of the central root cutting blade may be located essentially at the rear or trailing end of the shovel blade, or it may be located forwardly of the rear or trailing end of the shovel blade.

A pair of side blades project from respective substantially parallel side edges of the shovel blade and extend from locations at or near the rear or trailing end of the shovel blade. These side blades extend downwardly along portions of the side edges, typically to locations where the side edges begin to curve in forwardly converging relation. The side blades can be oriented in substantially normal relation with the respective side edges of the shovel blade, but preferably they are oriented in outwardly angulated or feed relation with the side edges of the shovel blade and in outwardly or forwardly diverging relation with one another. The side blades are each formed with downwardly facing sharpened cutting edges which efficiently cut through any surface roots that are present in the soil, after the shovel blade has penetrated into the soil to a certain extent, and thus permit the shovel blade to retain virtually of its soil load as the shovel handle is rotated in a prying action to break the soil away adjacent the lower cutting edge of the shovel blade. This feature also virtually eliminates any tendency of the shovel blade to be rotated by uneven side forces typically caused by the uneven resistance of surface roots adjacent the side edges of the shovel. The side blade cooperate with the central root cutting blade to divide the soil load into two basic sections which readily fall away from the concave face of the shovel blade when the shovel blade is rotated to dump its load.

At its lower end the shovel blade, rather than being pointed as is conventional, defines a small centrally oriented cutting edge section preferably of substantially straight configuration and being oriented in substantially perpendicular relation with the longitudinal center-line of the shovel blade. If desired, the lower centrally oriented cutting edge section may be of slightly convexly or concavely curved configuration, but it does not define a centrally oriented point. The lower centrally oriented cutting edge section for a typical round point shovel may be in the order of from about one and one-half inches in length to about three inches in length.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings.

DETAILED DESCRIPTION OF PREFERRED EMBODIMENT

Referring now to the drawings, a shovel adapted for manual handling and being manufactured according to the principles of the present invention is shown generally at 10 and having a shovel blade 12 that is generally of the "round point" type in that the blade is curved and defines a front smoothly curved concave blade face 14 and a rear smoothly curved convex blade face 16. Typically the shovel blade is formed from relatively thin sheet metal, such as hardened steel although it may be forged, stamped or otherwise formed from any suitable metal or non-metal stock. At the upper end of the shovel blade 12 is provided foot engaging elements 18 and 20 which may conveniently take the form of flanges bent from the sheet stock of the shovel blade and oriented in substantially normal relation with the front and rear blade faces. The foot engaging flanges typically correspond with the curvature of the blade faces, but are preferably significantly wider as compared to the foot engaging flanges of conventional shovels. If desired, the foot engaging elements may be provided in the form of fitments composed of metal, plastic or any other suitable material and which are fixed to respective sides of the rear or trailing end of the shovel blade. The shovel blade 12 also defines upper side edges 22 and 24 which are typically oriented in substantially parallel relation with one another. These side edges are not sharpened and merge smoothly with curved side edges 26 and 28 which normally, in the case of conventional round point shovels, converge at a point located along the longitudinal centerline 30 of the shovel blade.

In the case of the present invention, however, the curved side edges 26 and 28 establish intersection with reeve ends 32 and 34 of a substantially straight lower or forward end cutting edge 36. The forward end edge 36 is beveled from the front concave face 14 to the rear convex face 16 so as to define a beveled surface 38 forming a sharp cutting edge 40 at its intersection with the convex rear face 16 of the shovel blade 12. Although the forward end edge 36 and its beveled surface 38 and sharp edge 40 are preferably formed substantially straight and oriented in substantially perpendicular relation with the longitudinal center-line, such is not intended to limit the spirit and scope of the present invention. A forward end cutting edge of curved configuration, including convex or concave configuration will provide the shovel blade 12 with a forward end cutting edge having superior quality for cutting through fairly large tree roots. Being straight or slightly curved, the forward end edge 36 will not tend to react with the curvature of a tree root and cause the shovel blade to move laterally as the result of camming activity resulting from engagement of one of the curved edges 26 or 28 with a tree root, as is typical when round point shovels are forced against roots or are forced through soil containing tree roots.

Significant portions of the curved side edges 26 and 28 of the shovel blade are also beveled to define curved beveled surfaces 42 and 44 which also intersect and form sharp cutting edges with the convex face surface 14 of the shovel blade 12. These curved downwardly converging cutting edges of the shovel blade function exceptionally well to cut through soil, even consolidated soil containing a high percentage of clay, and to cut through surface grass, grass roots and the roots of weeds, so that the shovel blade becomes efficiently loaded when used.

At its upper end 46 the shovel blade 14 is provided with a pair of foot engaging elements 18 and 20 which are disposed for engagement by a foot of the user to thereby permit application of manual force to the shovel blade to drive it into the soil. Typically, these foot engaging elements are simply flanges that are formed by appropriate bending of the upper portion of the shovel blade, but the foot engaging flanged are of greater width as compared to those of conventional shovels. The foot engaging flanges of the present invention are sufficiently wide that the force applied by a user's foot to the shovel during use is evenly distributed to a significant surface area of the user's shoe sole and therefore does not cause the upper portion of the shovel blade 14 to damage the shoes of the user or cause injury or pain to the foot of the user. Though the foot engaging elements may conveniently take the form of flanges as shown at 18 and 20, the foot engaging elements may take the form of structural members composed of any suitable metal or various non-metal materials such as a suitable plastic material. In this case, the foot engaging elements may be fixed to the upper end of the shovel blade by welding or bonding or may be secured to the shovel blade structure by rivets or other suitable means for attachment.

To facilitate attachment of a handle to the shovel blade, a handle connector 52 is provided which defines a tubular internally tapered handle receptacle 54 adapted to receive and establish an efficient surface-to-surface fit with the generally conically tapered lower extremity of a shovel handle 56. The handle connector may be constructed and attached to the shovel blade in any suitable manner without departing from the spirit and scope of the present invention. In one suitable form, the handle connector can be a two part interfitting structure one half of which is defined by an integral, appropriately contoured extension from the upper portion of the shovel blade. Typically, the upper central portion of the shovel blade is contoured by forging or by sheet metal stamping or forming. The handle connector contour typically extends to the central portion of the shovel blade for the purpose of enhancing the structural integrity of the connection between the handle connection and shovel blade and to enhance the structural integrity of the shovel blade itself. The other, typically lower, section of the handle connector 52 can be a separate contoured structure which can be defined by a forging or stamping. A portion of the handle connector section can be formed with substantially the same curved and contoured geometry as a corresponding upper central section of the shovel blade and can be fixed to the shovel blade by welding, braising or by any other suitable means.

Figure 2:
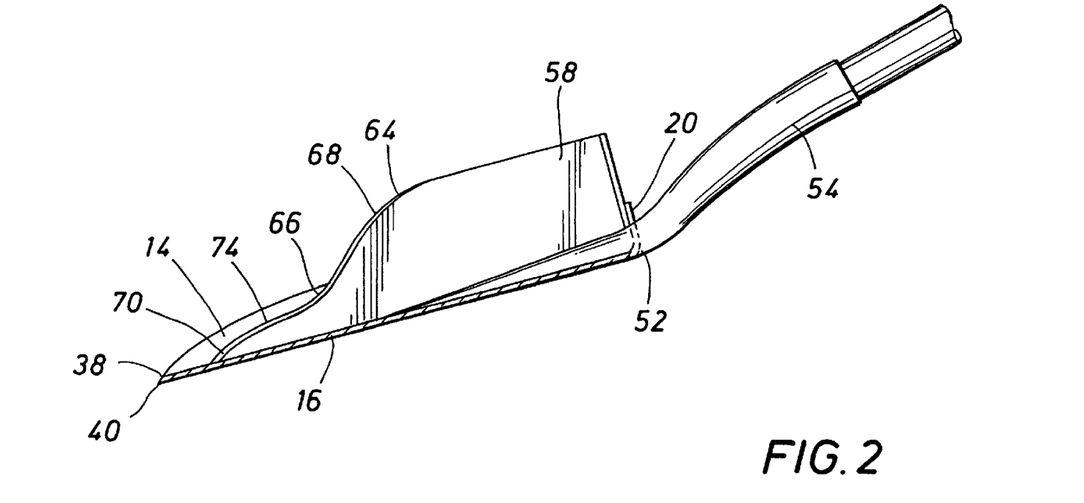
FIG. 2 is a section view taken along the centerline of the shovel blade of FIG. 1 and showing a central root cutting blade having a cutting edge of preferred configuration for cutting roots.
Figures 3A, 3B, 3C, 3D, 4:
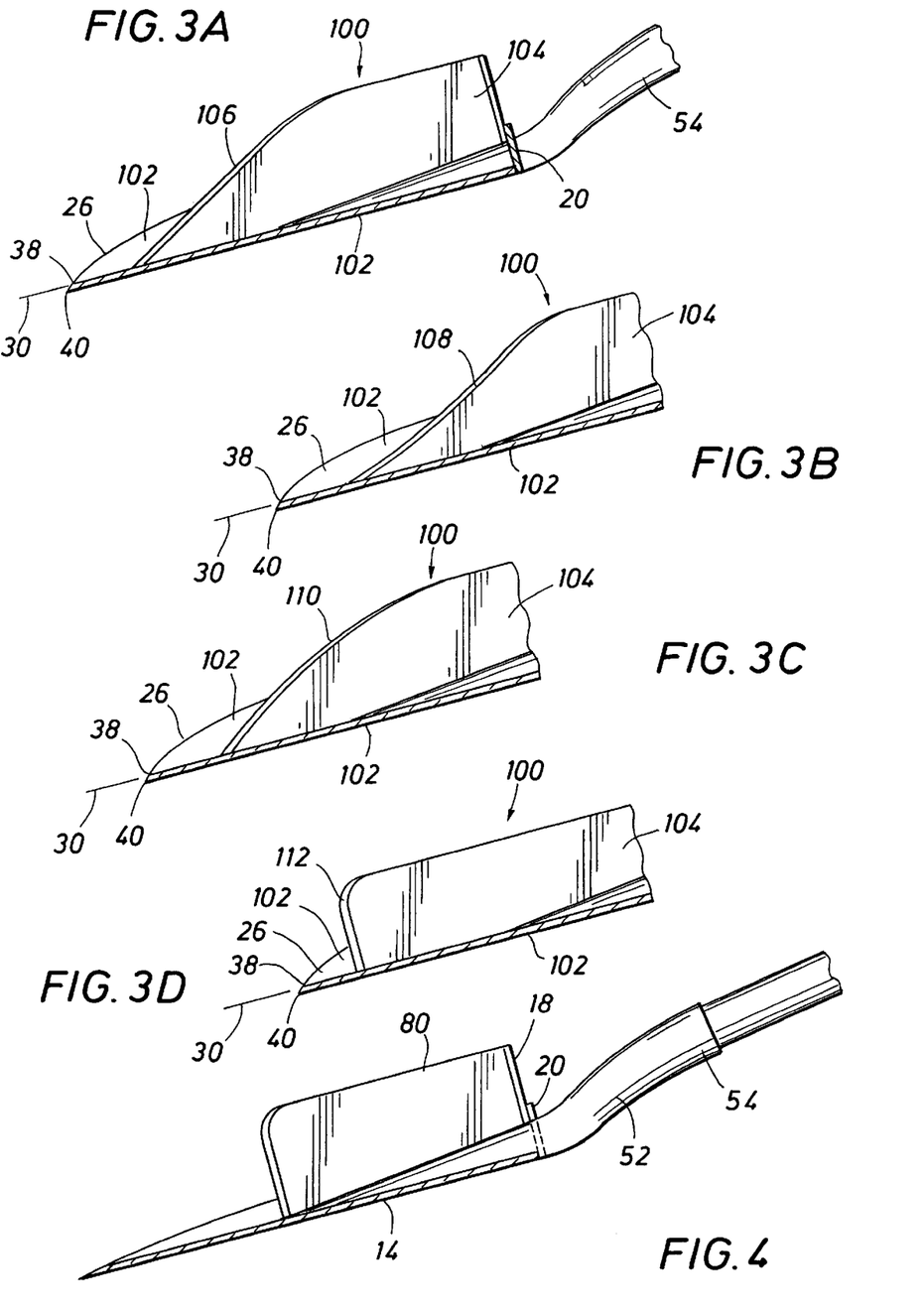
FIG. 3A is a section view similar to that of FIG. 2 and showing a centrally located root cutting blade having a straight, inclined root cutting edge shown in full line and having cutting edges of concave or convex configuration shown in broken line.
FIG. 3B is a partial section view, similar to that of FIG. 3A and showing a central root cutting blade having a cutting edge of concave configuration.
FIG. 3C is a partial section view, similar to that of FIG. 3A and showing a central root cutting blade having a cutting edge of convex configuration.
FIG. 3D is a partial section view, similar to that of FIG. 3A and showing a central root cutting blade having a cutting edge of substantially straight configuration and being oriented in substantially perpendicular relation with the shovel blade.
FIG. 4 is a longitudinal sectional view of the shovel blade construction the along line 4—4 of FIG. 5 and showing one of the lateral side cutting blades in detail.

According to the principles of the present invention, it is desirable to provide for cutting of tree roots when they are encountered during digging in the soil with a shovel. This feature is accomplished, not only by the substantially straight lower cutting edge 40 that is defined by the beveled surface 36–38, but also by the presence of a centrally located root cutting blade 58 which is generally located along the longitudinal center-line 30 of the shovel blade and extends along approximately 90% of the longitudinal length of the shovel blade, or from about one inch to about one and one-half inches from the sharp lower cutting edge 40, essentially as shown in the FIGS. 1 and 2. The longitudinal length of the centrally oriented root cutting blade may be greater than or less than 90% of the longitudinal length of the shovel blade, if desired, without departing from the spirit and scope of the present invention. For example, it may extend along from about 50% to about 90% of the longitudinal length of the shovel blade if desired. The bottom edge 60 of the centrally located root cutting blade 58 is configured to conform to the generally concave geometry of the shovel blade along the longitudinal center-line and is welded or otherwise fixed to the shovel blade. The upper edge 62 of the centrally located root cutting blade 58 may be oriented in substantially parallel relation with the longitudinal center-line 30 or it may have any other suitable orientation if desired. The upper edge 62 is preferably of blunt or unsharpened character since its purpose is to enhance the structural integrity of the central root cutting blade rather than perform a root cutting function. In a typical round-point style shovel, the centrally located root cutting blade 58 has a width of about 4", measured from the longitudinal center-line 30. The centrally located root cutting blade 58 may have a width greater than or less than 4" depending upon the character of shoveling activity to be accomplished, without departing from the spirit and scope of the present invention. The centrally located root cutting blade 58 also defines a front edge shown generally at 64 which is sharpened for the purpose of root cutting as the root cutting blade is driven through the soil along with the shovel blade. More particularly, the front edge 64 is disposed in generally inclined relation with respect to the longitudinal center-line 30 and preferably defines an intermediate curved cutting edge recess 66 which merges smoothly with upper and lower sections 68 and 70 of the front cutting edge 64. At the lower portion of the curved cutting edge recess, the sharpened front edge of the root cutting blade is oriented more toward the horizontal or less inclined as shown at 72 with respect to the longitudinal center-line 30 as shown in FIG. 3. When a tree root is encountered, the root can slide along the inclined cutting edge and enter the root cutting edge recess 66. With the tree root so positioned, the less inclined section of the cutting edge of the central root cutting blade will engage the under side of the root. Thus, when the shovel blade is essentially pivoted about the front cutting edge 40 with a prying action, the more horizontally oriented section 74 of the front root cutting edge of the central root cutting blade 58 exerts great cutting force against the tree root because of the short lever arm distance from the lower cutting edge 40 to the root cutting edge 64 of the root cutting blade 58 and the long lever arm distance from the root cutting edge 64 or the front cutting edge 40 to the end of the shovel handle 56. This permits the pivotal root cutting force being applied by the user to be significantly multiplied so that the sharpened front cutting edge 64 of the root cutting blade is enabled to cut very large tree roots, i.e., in the order of from one inch to three inches in diameter or greater.

Additionally, the central root cutting blade 58 will also cut through fairly large tree roots during normal shoveling activity. As the shovel blade 14 is driven through the soil by application of manual force applied to one of the foot engaging elements 48 or 50 by a foot of the user, any portion of the generally S-curved cutting edge 64 can come into cutting contact with a tree root. Because the entire front cutting edge 64 is inclined to varying degrees with respect to the longitudinal center-line, depending on the desires of the user, the sharpened front cutting edge 64 will engage the root in angular fashion, thus enhancing the root cutting action of the front cutting edge and enabling the root cutting edge to cut through large tree roots.

One of the problems associated with shoveling activities at sites where tree roots are present in the soil, is that a conventional shovel blade will tend to slide under a tree root as the shovel blade is forced through the soil. An inexperienced user will then apply a prying force to the shovel handle, pressing downwardly on the shovel handle to loosen or break loose a shovel load of soil. The tree root, however, will resist this prying action; thus, if the prying action is great enough, especially if the shovel handle is composed of wood, the shovel handle can easily be broken. When the root cutting shovel of the present invention is utilized the shovel blade will not slide under a root, because the root will be encountered by the forward cutting edge of the upstanding central root cutting blade. Thus, the user will easily discern that a root is present in the soil being shoveled. If a prying action is applied to the shovel blade under this condition, the shovel blade will pivot readily about the lower end of the shovel blade, beyond the lower portion 70 of the front cutting edge of the root cutting blade. It is not likely that sufficient resistance to pivotal movement will be developed, even by a novice user, to overstress the handle of a wood handled shovel. When the root is relatively small diameter, say in the order of one inch or less, the user can simply apply sharp and significant downward force to the shovel blade by essentially slamming or kicking the foot down on the foot engaging component 48 or 50 of the blade of the shovel, so that the sharpened front edge 64 of the root cutting blade 58 is caused to cut through the root. In the alternative, if the root is somewhat exposed and the soil consolidation will permit, the user can strike down on the root with the shovel blade, in a chopping action, causing the shovel blade to penetrate the soil and causing the root cutting blade to cut through the root.

The trailing end 76 of the root cutting blade 58 is preferably also provided with a flange element 78 or other suitable foot engaging fitting, which provides the root cutting blade with enhanced structural integrity and provides another foot engaging element that can be pushed or struck with the foot of the user to apply cutting force when a root is encountered during shoveling activity. If the central root cutting blade is located with its trailing end short of the foot engaging flanges of the shovel blade, such as shown in the alternative embodiment of FIG. 7, transversely oriented flanges will not ordinarily be used since the trailing end of the central root cutting blade is intended, under this condition, to pass through the soil being shoveled.

As mentioned above, another of the problems that is prevalent when conventional round point shovels are used is the resistance to separation of shovel loads of soil, particularly consolidated soil, due to the presence of grass and weed roots just beneath the surface of the soil. After a shovel has penetrated the soil to a desired extent, the user will typically apply a prying action to the shovel blade by moving the shovel handle forwardly or rearwardly. The soil on each side of the shovel blade and down to the point of the shovel blade will be fractured by this prying action, so that the shovel blade will essentially contain or support a load of soil having a thickness selected by the user. When surface roots are present within the soil, this prying action typically causes the surface roots of be broken so that the shovel load will contain segments of the roots. Unfortunately, the surface roots typically provide uneven resistance to breakage at respective sides of the shovel blade. Thus, after the load of soil on the shovel blade has been fractured from the surrounding soil by the usual prying action, the user will attempt to lift the shovel blade to remove the shovel load of soil and move it to a desired location. When this is done, the surface roots will typically fracture unevenly, thus applying a resistance force, typically to one side of the shovel blade. This uneven resistance force causes the blade of the shovel to rotate which causes the handle of the shovel to be rotated in the hands of the user. As the shovel rotates, its load will typically fall from the shovel blade, so that it must be scooped up and then removed from the site of shoveling activity. In many cases, the front edge of the shovel blade must be used in a chopping action to cut through these resisting surface roots so that the soil load that has fallen from the shovel blade can be scooped up and removed. This undesirable condition significantly increases the amount of manual labor that is required to accomplish shoveling activity. Not only does it quickly tire the worker, but it represents a significant labor cost if the shoveling activity is being done commercially.

When the presence and resistance of the surface roots is known, at times a user will first use the pointed end of the shovel blade in a chopping action to cut through the surface roots at locations equivalent to the intended location of the side edges of the shovel blade. With the surface roots pre-cut, the soil section representing the soil load of the shovel blade will fracture easily with a prying action. Such pre-cutting or chopping activity also significantly adds to the manual labor that is required for the shoveling activity and thus significantly adds to the work that is necessary for the worker and thus the cost of the labor for commercial shoveling operations.

Figure 5:
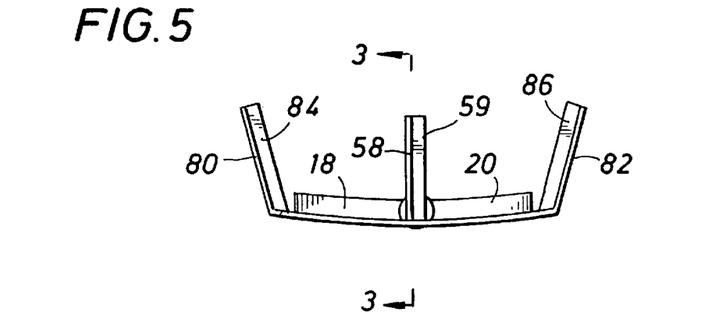
FIG. 5 is a top view of the shovel blade of FIGS. 1, 2 and 4.
Figure 6:
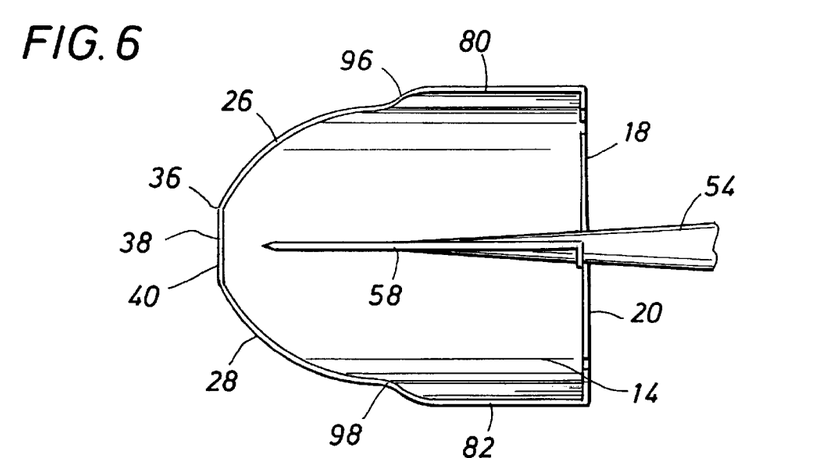
FIG. 6 is an elevational view of the concave face of the shovel blade construction and showing the central root cutting blade and the lateral side edge blades.

For the purpose of minimizing labor requirement and minimizing labor costs for shoveling activities, the root cutting shovel of the present invention is provided with a pair of side wing grass and root cutting flanges 80 and 82 that project upwardly from respective side edges 22 and 24 of the shovel blade 14. The side wing grass and root cutting flanges may be welded or otherwise fixed to the respective side edges of the shovel blade 14 or may be defined by side edge sections of the shovel blade that are bent upwardly to define the flanges 80 and 82. The side wing grass and root cutting flanges 80 and 82 may be oriented in essentially parallel relation with the perpendicularly oriented central root cutting flange 58 or in the alternative, and preferably, may be disposed in upwardly diverging relation or converging with one another. As shown in FIG. 5, the side wing grass and root cutting flanges 80 and 82 are preferably disposed in upwardly diverging relation with one another and serve as lateral soil support elements for enhancing the dimension of the soil load that the shovel blade is capable of containing. This is a significant advantage when shoveling activity is taking place in non-consolidated, i.e., loose, typically sandy soil. Preferably, the height of the side wing blades or flanges 80 and 82 with respect to the longitudinal center-line is slightly greater than the height of the central root cutting flange 58. For example, but not limiting in relation to the present invention, both the central root cutting blade and the side wing blades or flanges 80 and 82 may have a height of about 4" from their respective connections with the shovel blade 14. Because of the curvature of the concave front face of the shovel blade, however, the side wing blades or flanges 80 and 82 will in this case project above the level of the upper edge of the central root cutting blade. It should be borne in mind, however, that the height of the side wing blades or flanges 80 and 82 may be greater, the same, or less as compared to the height of the central root cutting blade without departing from the spirit and scope of the present invention.

The rear portions of each of the side wing blades or flanges 80 and 82 are preferably provided with rear end flanges or other suitable fitments 84 and 86 which enhance the structural integrity of the side wing blades or flanges 80 and 82 and also provide a safety factor to prevent injury to the user. Though the side wing blades or flanges 80 and 82 may not be provided with flanges or fitments, without departing from the spirit and scope of the present invention, it is believed that exposed thin edges, though not sharp, and if located near the trailing end of the shovel blade, can pose an element of danger to the user. These protective rear end flanges or fitments ensure against cutting or other injury to the feet and legs of the user. In the alternative, as shown in FIG. 7, if the trailing ends of the side wing flanges or blades are located well short of the trailing end of the shovel blade, then because the side blades are intended to pass through the soil being cut with the shovel, no transverse flanges will be present on the trailing ends of the side blades.

The front ends of each of the side wing blades or flanges 80 and 82 preferably curve from the top edges 88 and 90 thereof to respective sides of the shovel blade and preferably intersect the side edges 22 and 24 of the shovel blade at the points where the front edges of the shovel blade begin to curve toward the center-line 30. The curved front edges 92 and 94 are sharpened and define cutting edges 96 and 98 which efficiently cut through grass, weed roots and the small surface feeder roots of trees when the shovel blade has penetrated the soil to an extent of about one-third to about one-half of its length. When the shovel blade has penetrated the soil to its full extent, the surface roots on each side of the shovel blade will have been cut cleanly and the soil will have been cut on each side of the shovel blade to a depth below typical surface roots. A simple prying action of the shovel handle, at this point, will fracture away the soil load on each side of the shovel blade in a manner that will not encounter the uneven resistance forces that are caused by the roots that are ordinarily encountered when conventional round point shovels are used. As a consequence, the shovel will not tend to be rotated by uneven resistance caused by the presence of roots in the soil as indicated above and the shovel will retain its complete soil load in virtually every case, so that manual labor productivity for shoveling operations will be enhanced and labor costs will be minimized.

An alternative embodiment of the present invention is shown generally at 100 in FIG. 3, having a root cutting shovel blade 102 that is generally of the round point type and has the basic geometry shown in FIGS. 1, 2 and 4–6. The embodiment of FIG. 3 differs from that of the preferred embodiment only in the front cutting edge geometry of the central root cutting blade 104; thus like components of the shovel 100 are identified by corresponding reference numerals shown in FIGS. 1, 2 and 4–6. As shown in full line, the central root cutting blade 104 is provided with a substantially straight sharpened cutting edge 106 which is disposed in inclined relation with the longitudinal center-line 30. This inclined cutting edge will provide a root cutting function in much the same way as discussed above in connection with the root cutting edge 64 of the preferred embodiment shown in FIG. 2. As also shown in FIG. 3, the inclined root cutting edge may be concavely curved as shown in FIG. 3B at 108 or convexly curved as shown in FIG. 3C at 110. If desired, the front sharp edge of the central loot cutting blade may be straight and may be oriented in substantially perpendicular relation to the longitudinal center-line 30 of the shovel blade 102 as shown at 112 in FIG. 3D.

Figure 1:
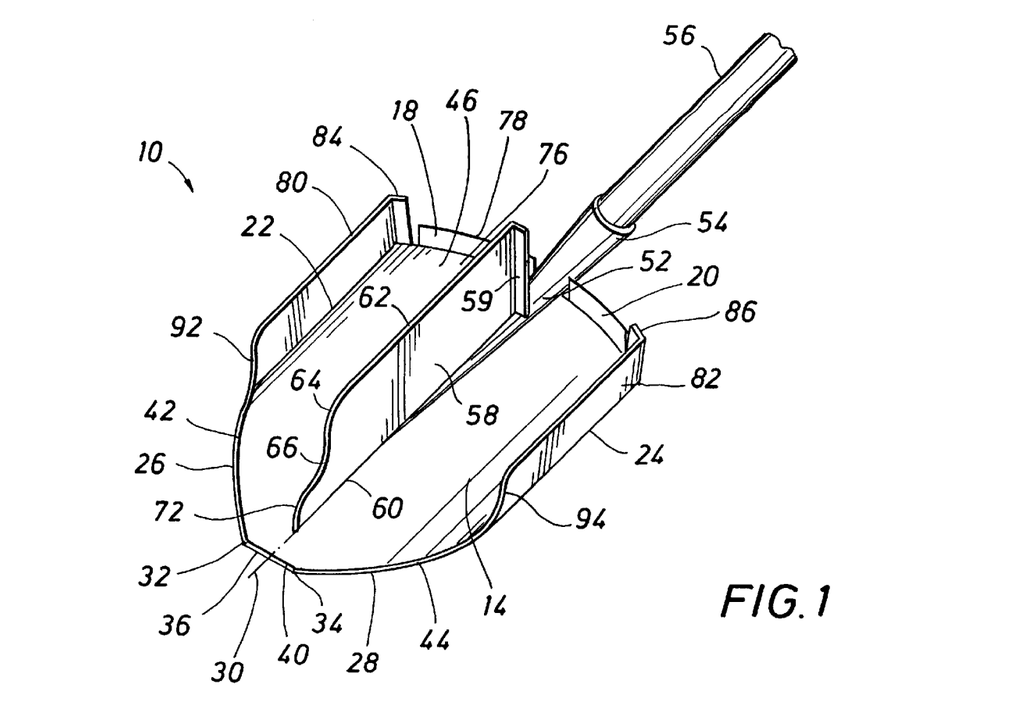
FIG. 1 is an isometric illustration of a round point type shovel constructed in accordance with the principles of the present invention and having a central root cutting blade, lateral edge blade and a flattened central cutting edge region.
Figure 7:
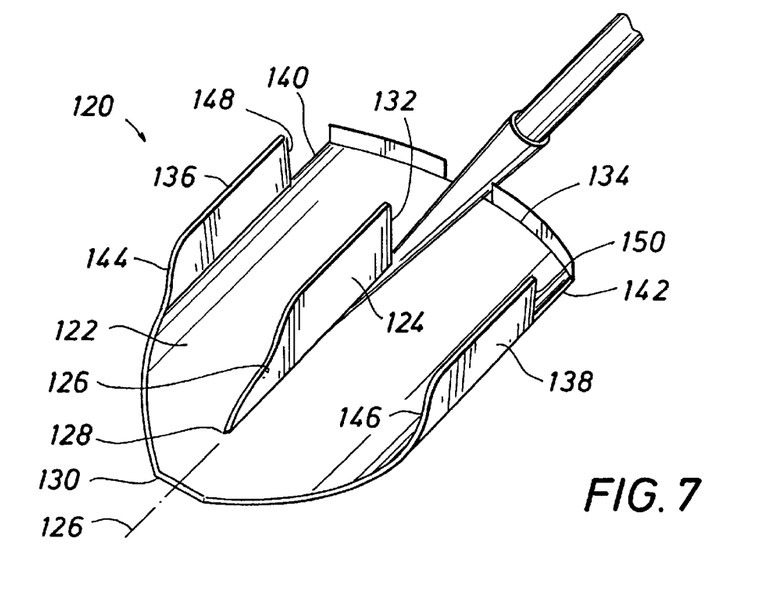
FIG. 7 is an isometric illustration of an alternative embodiment of the present invention, showing a central root cutting blade and side blades having a length and positioning being different from the embodiment of FIG. 1, but embodying the principles of the present invention.

Another embodiment of the present invention is shown in FIG. 7 wherein a round point style shovel shown generally at 120 is provided with a shovel blade 122 of the configuration shown in FIG. 1. A short central root cutting blade 124 is fixed to the shovel blade essentially along the longitudinal center-line 126 and is provided with a sharp forward cutting edge 126 having an S-curved configuration for enhanced root cutting capability as indicated above. The forward end 128 of the root cutting edge 126 is located in the range of from about one inch to about two inches from the substantially straight forward cutting edge 130 of the shovel blade 122. The trailing end 132 of the short central root cutting blade 124 is located well forward of the trailing end 134 of the shovel blade and, since the blade 124 is intended to pass through the soil as the shovel blade penetrates the soil to its full extent, no transverse flange is present on the central root cutting blade.

A pair of short side flanges 136 and 138 are fixed to respective sides 140 and 142 of the shovel blade 122 and are preferably disposed in forwardly diverging relation with respect to the front concave face of the shovel blade. The side flanges 136 and 138 are each provided with forward cutting edges 144 and 146 and respective trailing edges 148 and 150. The trailing edges 148 and 150 are located well forwardly of the trailing edge 134 of the shovel blade 122 and are not provided with transverse flanges.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A root cutting shovel for manual use, comprising:
  (a) a shovel blade having concave and convex faces and defining a longitudinal center-line and having side edges, a forward cutting edge and a blade rear edge, said shovel blade defining a handle connector receptacle having a shovel handle fixed therein;
  (b) an elongate root cutting blade being fixed to said shovel blade substantially along said longitudinal center-line and projecting from said concave face, said elongate root cutting blade extending from said blade rear edge along a major portion of said longitudinal center-line to a location adjacent said forward cutting edge; and
  (c) a forwardly oriented sharpened root cutting edge being defined on said elongate root cutting blade and generally facing said forward cutting edge of said shovel blade, said forwardly oriented root cutting edge being inclined with respect to said longitudinal center-line.

2. The root cutting shovel of claim 1, comprising:
  said sharpened root cutting edge defining an intermediate root cutting recess.

3. The root cutting shovel of claim 1, comprising:
  said sharpened root cutting edge being of curved configuration and defining an intermediate sharpened root cutting recess and forming a lower cutting edge section having less inclination with said longitudinal center-line as compared with other portions of said sharpened root cutting edge.

4. The root cutting shovel of claim 1, comprising:
  a structural element defining the rear blade portion of said root cutting blade and enhancing the structural integrity of said root cutting blade.

5. The root cutting shovel of claim 4, wherein:
  said structural element being in the form of a flange being integral with said root cutting blade and being oriented in substantially perpendicular relation with said root cutting blade.

6. The root cutting shovel of claim 1, comprising:
(a) said side edges having substantially straight and generally parallel upper edge sections and curved forwardly converging edge sections; and
(b) said forward cutting edge having a transversely oriented cutting edge section defining ends and being intersected at each end thereof by each of said curved forwardly converging edge sections of said side edges.

7. The root cutting shovel of claim 1, comprising:
(a) a pair of side blades projecting from respective side edges of said shovel blade and defining forward ends; and
(b) forwardly facing cutting edges being defined on each of said forward ends of said side blades.

8. The root cutting shovel of claim 7, comprising:
said pair of side blades being of substantially straight configuration and being disposed in diverging relation with one another.

9. The root cutting shovel of claim 1, comprising:
(a) a substantially straight end edge defining a portion of said forward cutting edge of said shovel blade and being oriented in substantially perpendicular relation with said longitudinal center-line; and
(b) a beveled front cutting edge surface being defined by said substantially straight end edge and having intersection with said convex face of said shovel blade and with said generally curved forward cutting edge.

10. A root cutting shovel for manual use, comprising:
(a) a shovel blade having a longitudinal length and defining concave and convex faces, said shovel blade defining a longitudinal center-line and having side edges having generally parallel side edge sections and curved side edge sections, a blade rear portion and a generally curved forward cutting edge, said shovel blade defining a handle connector receptacle having a shovel handle fixed therein;
(b) an elongate root cutting blade being fixed to said shovel blade substantially along said longitudinal center-line and projecting from said concave face and extending from said blade rear portion to a location adjacent said forward cutting edge;
(c) a sharpened root cutting edge being defined on said root cutting blade and generally facing said forward cutting edge, said sharpened root cutting edge intersecting and being inclined with respect to said longitudinal center-line;
(d) a pair of side blades being fixed to said substantially parallel sections of said side edges of said shovel blade and projecting from said concave face; and
(e) side blade cutting edges being defined by each of said side blades and also generally facing said forward cutting edge of said shovel blade.

11. The root cutting shovel of claim 10, comprising:
(b) a substantially straight forward end edge having ends intersecting said forward cutting edge of said shovel blade and being oriented in substantially perpendicular relation with said longitudinal center-line; and
(b) a beveled front cutting edge being defined by said substantially straight forward end edge and defining a sharp cutting edge at the intersection thereof with said convex face of said shovel blade.

12. The root cutting shovel of claim 10, comprising:
said side blades being disposed in diverging relation from said concave face.

13. The root cutting shovel of claim 10, comprising:
said side blades defining trailing edges located forwardly of said trailing edge of said shovel blade.

14. The root cutting shovel of claim 10, comprising:
said side blade cutting edges being oriented in inclined relation with said longitudinal center-line.

15. The root cutting shovel of claim 10, comprising:
said sharpened root cutting edge being of curved configuration and defining a sharpened intermediate root cutting recess and forming a lower cutting edge section having less inclination with said longitudinal center-line as compared with other portions of said sharpened root cutting edge.

16. The root cutting shovel of claim 10, comprising:
(a) a structural element defining a rear portion of said root cutting blade and enhancing the structural integrity thereof;
(b) said structural element being in the form of a flange being integral with said root cutting blade and being oriented in substantially perpendicular relation with said root cutting blade;
(c) said side edges of said shovel blade having substantially straight and generally parallel upper edge sections and curved lower edge sections; and
(d) said substantially straight end edge having a transversely oriented cutting edge section defining ends and being intersected at each end thereof by said curved lower edge sections of said side edges.

17. The root cutting shovel of claim 10, wherein:
(a) said pair of side blades projecting from respective side edges of said shovel blade and defining front ends;
(b) cutting edges being defined on each of said side blades at said front ends; and
(c) said pair of side blades being disposed in diverging relation with one another.

18. A root cutting shovel for manual use, comprising:
(a) a shovel blade having concave and convex faces and having side edges defining generally parallel side edge sections and curved side edge sections, a blade rear edge and a generally curved front cutting edge, said shovel blade defining a longitudinal center-line and having a handle connector receptacle having a shovel handle fixed therein;
(b) a pair of side blades being fixed to said generally parallel side edge sections of said side edges of said shovel blade and projecting from said concave face and being disposed in diverging relation with one another;
(c) side blade cutting edges being defined by each of said side blades and also generally facing said front cutting edge of said shovel blade;
(d) a root cutting blade being fixed to said shovel blade substantially along said longitudinal center-line and projecting from said concave face, said root cutting blade extending from said rear blade edge to a location adjacent said generally curved front cutting edge of said shovel blade and enhancing the structural integrity of said shovel blade;
(e) structural elements being located on said blade rear edge and on said root cutting blade and enhancing the structural integrity thereof; and
(f) a sharpened root cutting edge being defined on said root cutting blade and generally facing said front cutting edge, said sharpened root cutting edge being disposed in inclined relation with said longitudinal center-line.

* * * * *

UNITED STATES PATENT AND TRADEMARK OFFICE
CERTIFICATE OF CORRECTION

PATENT NO. : 6,338,511 B1
DATED : January 15, 2002
INVENTOR(S) : Ormond S. Douglas and William P. Killen It is certified that error appears in the above-identified patent and that said Letters Patent is hereby corrected as shown below:

Column 1,
Line 32, correct "rearwadly" to read -- rearwardly --
Line 33, change "define" to -- defines --

Column 2,
Line 10, correct "shapened" to read -- sharpened --
Line 31, correct "interstion" to read -- intersection --
Line 51, change "in" to -- is --

Column 3,
Line 2, change "ted" to -- rotated --
Line 30, correct "trough" to read -- through --
Line 57, correct "shapened" to read -- sharpened --

Column 4,
Line 3, correct "trough" to read -- through --
Line 57, change "feed" to -- flared --
Line 64, after "virtually" insert -- all --

Column 5,
Line 3, change "blade" to -- blades --
Line 61, delete "the" and insert -- taken --

Column 6,
Line 38, change "reeve" to read -- respective --

Column 7,
Line 10, change "flanged" to -- flanges --

Column 9,
Line 56, change "of" to -- to --

UNITED STATES PATENT AND TRADEMARK OFFICE
CERTIFICATE OF CORRECTION

PATENT NO.    : 6,338,511 B1
DATED         : January 15 2002
INVENTOR(S)   : Ormond S. Douglas and William P. Killen

It is certified that error appears in the above-identified patent and that said Letters Patent is hereby corrected as shown below:

<u>Column 11,</u>
Line 51, change "FIG. 3" to -- FIG. 3A --
Line 54, change "loot" to -- root --

Signed and Sealed this

Eleventh Day of June, 2002

*Attest:*

*Attesting Officer*

JAMES E. ROGAN
*Director of the United States Patent and Trademark Office*